US012800390B2

(12) United States Patent
Cheng

(10) Patent No.: US 12,800,390 B2
(45) Date of Patent: Nov. 17, 2026

(54) APPARATUS FOR FILTERING LIGHTING SOURCE OF SEMICONDUCTOR APPEARANCE DETECTION DEVICE

(71) Applicant: Shanghai Huali Integrated Circuit Corporation, Shanghai (CN)

(72) Inventor: Peng Cheng, Shanghai (CN)

(73) Assignee: Shanghai Huali Integrated Circuit Corporation, Shanghai (CN)

( * ) Notice: Subject to any disclaimer, the term of this patent is extended or adjusted under 35 U.S.C. 154(b) by 415 days.

(21) Appl. No.: 18/426,052

(22) Filed: Jan. 29, 2024

(65) Prior Publication Data

US 2024/0344884 A1 Oct. 17, 2024

(30) Foreign Application Priority Data

Apr. 13, 2023 (CN) ........................ 202310397145.9

(51) Int. Cl.

| | |
|---|---|
| ***G01J 3/02*** | (2006.01) |
| ***F21V 9/40*** | (2018.01) |
| ***F21V 14/00*** | (2018.01) |
| ***G01N 21/31*** | (2006.01) |
| ***G02B 26/00*** | (2006.01) |

(52) U.S. Cl.

CPC .............. *G01J 3/0229* (2013.01); *F21V 9/40* (2018.02); *G02B 26/008* (2013.01); *F21V 14/006* (2013.01); *G01N 2021/3174* (2013.01)

(58) Field of Classification Search

CPC ........ G01J 3/0229; F21V 9/40; F21V 14/006; G02B 26/008; G01N 2021/3174

USPC ........................................................ 356/326

See application file for complete search history.

(56) References Cited

U.S. PATENT DOCUMENTS 7,980,705 B2 * 7/2011 Ogawa ................. G02B 26/008 348/835
2005/0157274 A1 * 7/2005 Lin ........................ G03B 21/26 353/84
2006/0274285 A1 * 12/2006 Pao ........................ G03B 27/54 353/84

FOREIGN PATENT DOCUMENTS

CN 102645826 A * 8/2012 ......... G03B 21/2033
CN 103841387 A * 6/2014 ............... H04N 9/31
JP H07281284 A * 10/1995 ....... G03B 2217/244

(Continued)

OTHER PUBLICATIONS

Oh, Ji Hye, et al. "High-color-quality multipackage phosphor-converted LEDs for yellow photolithography room lamp." IEEE Photonics Journal 7.2 (2015): 1-8. (Year: 2015).*

*Primary Examiner* — Michelle M Iacoletti
*Assistant Examiner* — Noah J. Haney
(74) *Attorney, Agent, or Firm* — Quarles & Brady LLP

(57) ABSTRACT

The present invention provides an apparatus for filtering a lighting source of a semiconductor appearance detection device, including a white light source; a filter color wheel, the filter color wheel being provided with a first color filter plate, and the first color filter plate being configured to output the white light source as yellow light; a spectrometer, configured to detect whether a wavelength of the output yellow light meets the requirement of a photolithography technique; and a light equalizing plate, configured to perform background illumination on the output yellow light meeting the requirement of the photolithography technique. According to the present invention, the actual requirement of multi-light source switching is considered, and the filter color wheel can switch modes such as white light and purple light.

5 Claims, 2 Drawing Sheets

(56) References Cited

FOREIGN PATENT DOCUMENTS

| | | | | | |
|---|---|---|---|---|---|
| JP | 2000306819 A | * | 11/2000 | ............... | G09G 5/02 |
| JP | 2008198888 A | * | 8/2008 | ............... | G03F 7/20 |
| TW | M398614 U | * | 2/2011 | ................ | F21V 7/22 |

* cited by examiner

APPARATUS FOR FILTERING LIGHTING SOURCE OF SEMICONDUCTOR APPEARANCE DETECTION DEVICE

CROSS-REFERENCES TO RELATED APPLICATIONS

This application claims priority to Chinese patent application No. CN 202310397145.9, filed on Apr. 13, 2023 at CNIPA, and entitled "APPARATUS FOR FILTERING LIGHTING SOURCE OF SEMICONDUCTOR APPEARANCE DETECTION DEVICE", the disclosure of which is incorporated herein by reference in entirety.

TECHNICAL FIELD

The present invention relates to the technical field of semiconductors, and in particular to an apparatus for filtering a lighting source of a semiconductor appearance detection device.

BACKGROUND

Photoresist, commonly used in the semiconductor industry, has an exposure effect when exposed to light (particularly ultraviolet rays), so the photoresist should be kept away from the light source before development.

A Camtek ADI backside illuminated (BSI) module uses the white light, and the white light will expose a base material coated with a photoresist layer within a few seconds, so that it is impossible to repeat the photolithography technique.

Therefore, it is necessary to propose a new apparatus to solve the above problem.

BRIEF SUMMARY

In view of the shortcomings in the prior art, an objective of the present invention is to provide an apparatus for filtering a lighting source of a semiconductor appearance detection device, which is used for solving the problem in the prior art that white light in a BSI lighting module will expose a base material coated with a photoresist layer within in a few seconds.

To achieve the above objective and other related objectives, the present invention provides an apparatus for filtering a lighting source of a semiconductor appearance detection device, at least including:

- a white light source;
- a filter color wheel, the filter color wheel being provided with a first color filter plate, and the first color filter plate being configured to output the white light source as yellow light;
- a spectrometer, configured to detect whether a wavelength of the output yellow light meets the requirement of a photolithography technique; and
- a light equalizing plate, configured to perform background illumination on the output yellow light meeting the requirement of the photolithography technique.

Preferably, the white light source is provided with a lampshade.

Preferably, the filter color wheel is mounted on the lampshade.

Preferably, a second color filter plate and a third color filter plate are arranged on the filter color wheel; the second color filter plate completely transmits the white light source; and the third color filter plate is configured to output the white light source as purple light.

Preferably, the wavelength of the output yellow light meeting the requirement of the photolithography technique is greater than 450 nm.

Preferably, the first color filter plate, the second color filter plate and the third color filter plate are sequentially distributed on the filter color wheel in a fan shape; and the first color filter plate, the second color filter plate and the third color filter plate are arranged and combined on the filter color wheel to form a circle.

Preferably, the white light source is arbitrarily switched on the filter color wheel through the first color filter plate, the second color filter plate and the third color filter plate to output the illumination specified in the yellow light, white light or purple light.

As mentioned above, the lighting source of a semiconductor appearance detection device provided by the present invention has the following beneficial effects: according to the present invention, the filter color wheel special for a photoetching chamber is mounted above the lampshade of the white light source to filter the white light as a yellow light wave band for output; meanwhile, the actual requirement of multi-light source switching is considered, and the filter color wheel can switch modes such as white light and purple light. It is confirmed through full-spectrum detection that the wavelength of the yellow light meets the requirement of the photolithography technique, the cost is saved, and the wave band is controlled stably and reliably.

DETAILED DESCRIPTION OF THE EMBODIMENTS

The implementation manners of the present invention are described below by the specific embodiments. Those skilled in the art may easily understand other advantages and effects of the present invention by the contents disclosed by the specification. The present invention can be implemented or applied through other different specific implementation manners. Various modifications or changes can be made to various details in the specification based on different viewpoints and applications without departing from the spirit of the present invention.

Figure 1:
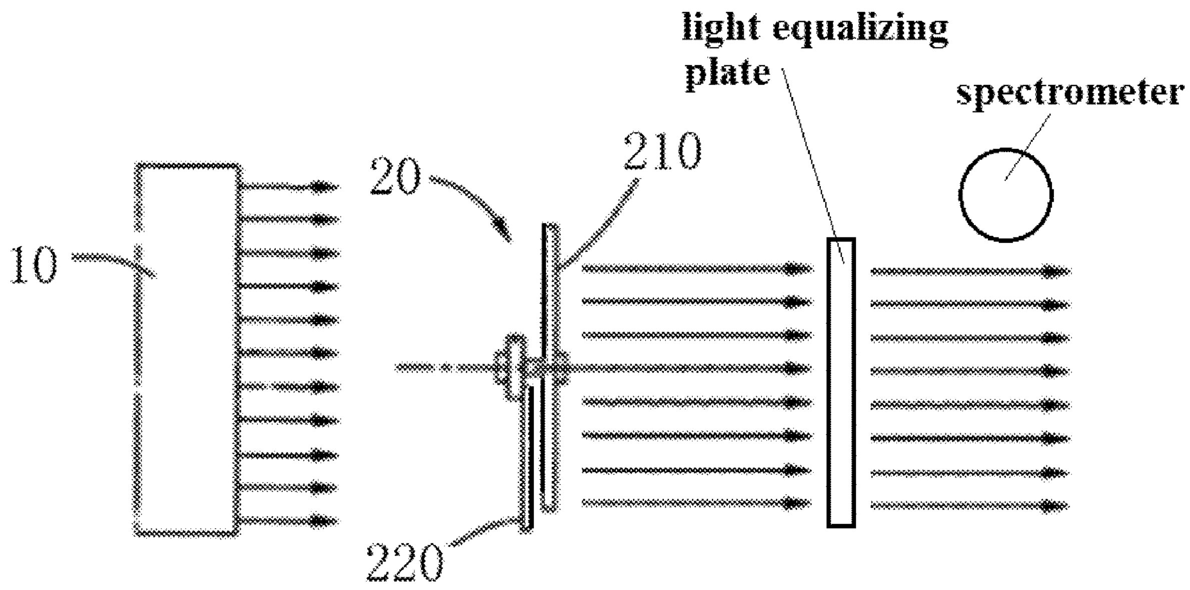
FIG. 1 is a schematic diagram of a white light source passing through a filter color wheel according to the present invention.
Figure 2:
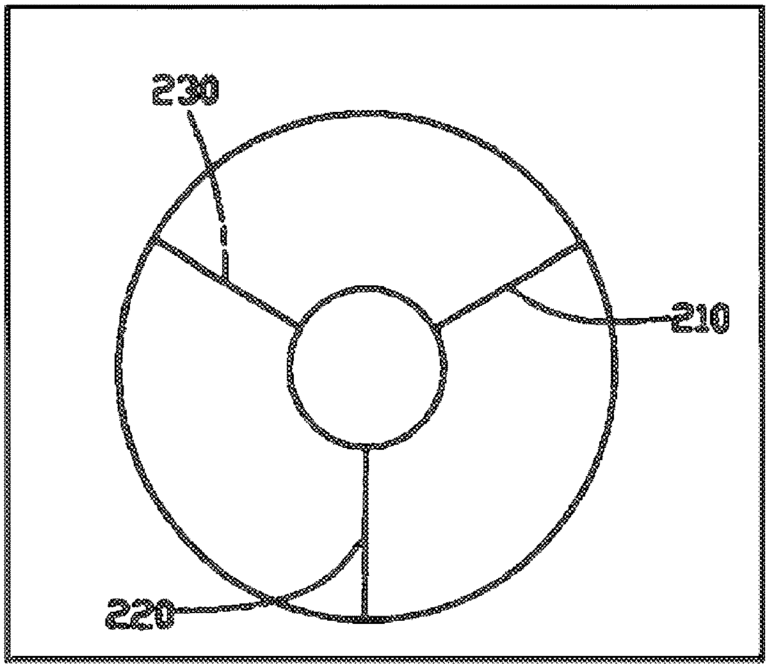
FIG. 2 is a schematic diagram of distribution of a first color filter plate, a second color filter plate and a third color filter plate on a filter color wheel.
Figure 3:
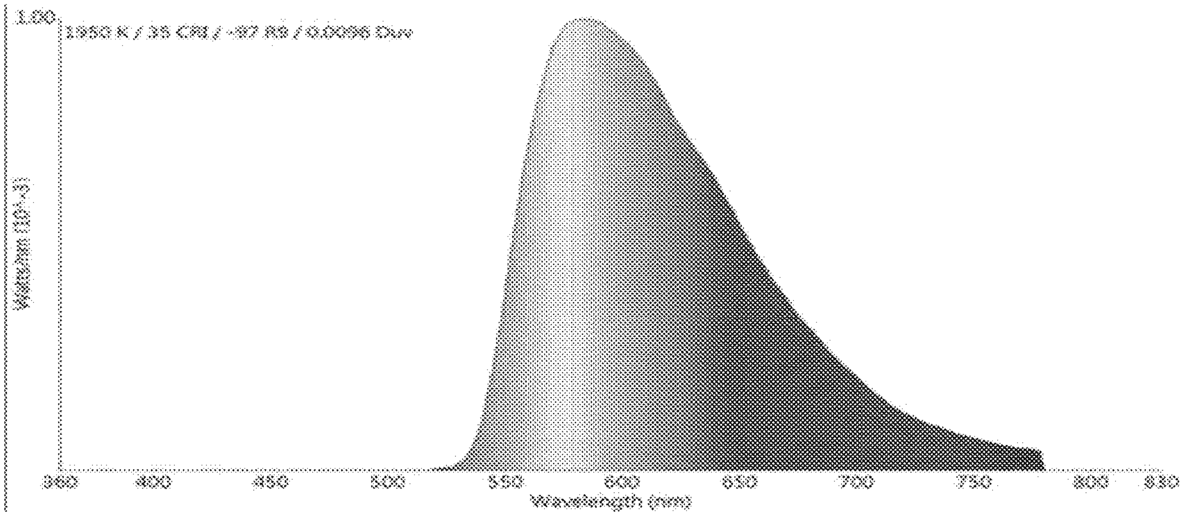
FIG. 3 is an oscillogram of a wavelength of yellow light detected and output by a spectrometer along with the change of power according to the present invention.

Refer to FIG. 1 to FIG. 3. It should be noted that the figure provided in this embodiment only describes the basic concept of the present invention schematically, so only the components related to the present invention are shown in the figure instead of drawing according to the number, shape and size of the components in actual implementation. The type, number and proportion of each component may be arbitrarily changed during actual implementation, and the layout type of the component may also be more complex.

The present invention provides an apparatus for filtering a lighting source of a semiconductor appearance detection device, at least including:

a white light source;

a filter color wheel, the filter color wheel being provided with a first color filter plate, and the first color filter plate being configured to output the white light source as yellow light;

a spectrometer, configured to detect whether a wavelength of the output yellow light meets the requirement of a photolithography technique; and a light equalizing plate, configured to perform background illumination on the output yellow light meeting the requirement of the photolithography technique.

Further, in this embodiment of the present invention, the white light source is provided with a lampshade.

Further, in this embodiment of the present invention, the filter color wheel is mounted on the lampshade.

Further, in this embodiment of the present invention, a second color filter plate and a third color filter plate are arranged on the filter color wheel; the second color filter plate completely transmits the white light source; and the third color filter plate is configured to output the white light source as purple light.

Further, in this embodiment of the present invention, the wavelength of the output yellow light meeting the requirement of the photolithography technique is greater than 450 nm.

Further, in this embodiment of the present invention, the first color filter plate, the second color filter plate and the third color filter plate are sequentially distributed on the filter color wheel in a fan shape; and the first color filter plate, the second color filter plate and the third color filter plate are arranged and combined on the filter color wheel to form a circle.

Further, in this embodiment of the present invention, the white light source is arbitrarily switched on the filter color wheel through the first color filter plate, the second color filter plate and the third color filter plate to output the illumination specified in the yellow light, white light or purple light.

The present invention provides an apparatus for filtering a lighting source of a semiconductor appearance detection device. As shown in FIG. 1, FIG. 1 is a schematic diagram of a white light source passing through a filter color wheel according to the present invention. A filter color wheel 20 in FIG. 1 is a side view. The apparatus includes a white light source 10 and the filter color wheel 20. The filter color wheel 20 is provided with a first color filter plate 210. The first color filter plate 210 is configured to output the white light source 10 as yellow light. That is, after the white light source 10 passes through the first color filter plate 210 on the filter color wheel, the yellow light is output, that is, the first color filter plate 210 converts the white light source into the yellow light.

In this embodiment, the white light source is provided with a lampshade; and the filter color wheel is mounted on the lampshade. FIG. 1 only shows a relative position relationship between the white light source and the filter color wheel.

In this embodiment, a second color filter plate and a third color filter plate are arranged on the filter color wheel; the second color filter plate completely transmits the white light source; and the third color filter plate is configured to output the white light source as purple light. As shown in FIG. 2, FIG. 2 is a schematic diagram of distribution of a first color filter plate, a second color filter plate and a third color filter plate on a filter color wheel. In this embodiment, a second color filter plate 220 and a third color filter plate 230 are arranged on the filter color wheel 20. FIG. 1 only shows the first color filter plate 210 and the second color filter plate 220 because FIG. 1 is a side view of the filter color wheel. The second filter color plate 220 completely transmits the white light source, that is, the second color filter plate completely transmits the white light source, and white light is still output; and the third color filter plate 230 is configured to output the white light source as purple light, that is, the white light source is output as the purple light after passing through the third color filter plate. As shown in FIG. 2, in this embodiment, the first color filter plate, the second color filter plate and the third color filter plate are sequentially distributed on the filter color wheel in a fan shape; and the first color filter plate, the second color filter plate and the third color filter plate are arranged and combined on the filter color wheel to form a circle. The white light source is arbitrarily switched on the filter color wheel through the first color filter plate the third color filter plate to output the illumination specified in the yellow light, white light or purple light.

The apparatus further includes a spectrometer. The spectrometer is configured to detect whether a wavelength of the output yellow light meets the requirement of a photolithography technique. Only the yellow light meeting the requirement of a photolithography technique can become background illumination in photoetching. In this embodiment, the wavelength of the output yellow light meeting the requirement of the photolithography technique is greater than 450 nm. As shown in FIG. 3, FIG. 3 is an oscillogram of a wavelength of yellow light detected and output by a spectrometer along with the change of power according to the present invention.

The apparatus further includes a light equalizing plate. The light equalizing plate is configured to perform background illumination on the output yellow light meeting the requirement of the photolithography technique. The uniformity of the yellow light is higher after the yellow light passes through the light equalizing plate.

In conclusion, according to the present invention, the filter color wheel special for a photoetching chamber is mounted above the lampshade of the white light source to filter the white light as a yellow light wave band for output; meanwhile, the actual requirement of multi-light source switching is considered, and the filter color wheel can switch modes such as white light and purple light. It is confirmed through full-spectrum detection that the wavelength of the yellow light meets the requirement of the photolithography technique, the cost is saved, and the wave band is controlled stably and reliably. Therefore, the present invention effectively overcomes the defects in the prior art and has high industrial utilization value.

The above embodiments are only intended to exemplarily illustrate the principle and effect of the present invention, but not intended to limit the present invention. Any person skilled in the art can modify or change the above embodiments without departing from the spirit and scope of the present invention. Therefore, all equivalent modifications or changes made by those with ordinary knowledge in the art without departing the spirit and technical ideal disclosed by the present invention should still be covered within the claims of the present invention.

What is claimed is:

1. An apparatus for filtering a lighting source of a semiconductor appearance detection device, comprising:

a white light source;

a filter color wheel, the filter color wheel being provided with one first color filter plate, one second color filter plate and one third color filter plate; wherein the first color filter plate, the second color filter plate and the third color filter plate are sequentially distributed on the filter color wheel in a fan shape; and the first color filter plate, the second color filter plate and the third color filter plate are arranged and combined on the filter color wheel to form a circle;

and the first color filter plate being configured to output the white light source as yellow light; the second color filter plate completely transmits the white light source; and the third color filter plate is configured to output the white light source as purple light;

a spectrometer, configured to detect whether a wavelength of the output yellow light meets the requirement of a photolithography technique; and a light equalizing plate, configured to perform background illumination on the output yellow light meeting the requirement of the photolithography technique.

2. The apparatus for filtering a lighting source of a semiconductor appearance detection device according to claim 1, wherein the white light source is provided with a lampshade.

3. The apparatus for filtering a lighting source of a semiconductor appearance detection device according to claim 2, wherein the filter color wheel is mounted on the lampshade.

4. The apparatus for filtering a lighting source of a semiconductor appearance detection device according to claim 1, wherein the wavelength of the output yellow light meeting the requirement of the photolithography technique is greater than 450 nm.

5. The apparatus for filtering a lighting source of a semiconductor appearance detection device according to claim 1, wherein the white light source is arbitrarily switched on the filter color wheel through the first color filter plate, the second color filter plate and the third color filter plate to output the illumination specified in the yellow light, white light or purple light.

* * * * *